US007721751B1

(12) United States Patent

Perrien

(10) Patent No.: US 7,721,751 B1

(45) Date of Patent: May 25, 2010

(54) FUEL DISPENSING SYSTEM

(76) Inventor: Timothy Perrien, 8120 K Cove Rd., Rogers, AR (US) 72756

(*) Notice: Subject to any disclaimer, the term of this patent is extended or adjusted under 35 U.S.C. 154(b) by 571 days.

(21) Appl. No.: 11/801,013

(22) Filed: May 8, 2007

Related U.S. Application Data

(60) Provisional application No. 60/798,813, filed on May 9, 2006.

(51) Int. Cl.
*B60S 5/02* (2006.01)

(52) U.S. Cl. .................................... 137/234.6; 137/357

(58) Field of Classification Search .............. 137/234.6, 137/357; 222/173
See application file for complete search history.

(56) References Cited

U.S. PATENT DOCUMENTS

| | | | | |
|---|---|---|---|---|
| 2,021,544 | A | 11/1935 | Crown | |
| 2,959,826 | A | 11/1960 | Larsen | |
| 3,395,723 | A | 8/1968 | Tatsuno | |
| 3,774,723 | A | 11/1973 | Johnston | 186/1 |
| 4,901,748 | A | 2/1990 | Shotmeyer | 137/234 |
| 4,986,446 | A | 1/1991 | Montgomery et al. | 222/94 |
| 5,114,046 | A | 5/1992 | Bryant | 222/108 |
| 5,299,709 | A | 4/1994 | Beerbower et al. | 220/445 |
| 5,400,924 | A | 3/1995 | Brodie | 222/108 |
| 5,413,135 | A | 5/1995 | Poole | 137/15 |
| 5,526,964 | A | 6/1996 | Moore et al. | 222/383.1 |
| 5,634,503 | A | 6/1997 | Musil et al. | 141/232 |
| 5,711,456 | A | 1/1998 | Bryant | 222/108 |
| 5,954,085 | A | 9/1999 | Moore et al. | 137/234.6 |
| 5,975,371 | A | 11/1999 | Webb | 222/173 |
| 6,105,602 | A | 8/2000 | Sistonen | 137/234.6 |
| 6,109,290 | A | 8/2000 | Sabatinelli | 137/234.6 |
| 6,311,873 | B1 * | 11/2001 | Willeke et al. | 137/234.6 |
| 6,435,204 | B2 | 8/2002 | White et al. | 137/234.6 |
| 6,820,378 | B2 | 11/2004 | Lehto | 52/126.5 |

* cited by examiner

*Primary Examiner*—Kevin L Lee

(74) *Attorney, Agent, or Firm*—Keisling & Pieper PLC; Meredith K. Lowry

(57) ABSTRACT

A fueling station comprising an above-ground tank, above-ground piping, and above-ground fuel pump modules adapted for easy construction, installation, and maintenance.

20 Claims, 4 Drawing Sheets

FUEL DISPENSING SYSTEM

CROSS-REFERENCE TO RELATED APPLICATIONS

This application claims priority to and is a continuation-in-part of U.S. application Ser. No. 60/798,813, filed May 9, 2006.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to the field of fueling station structures. In particular, the present invention relates specifically to a fueling station structure without subterraneous tanks or piping.

2. Description of the Known Art

As will be appreciated by those skilled in the art, fuel stations conventionally store fuel underground in tanks with underground piping running from the tanks to the fuel pump. Patents disclosing information relevant to fuel stations include U.S. Pat. No. 2,021,544, issued to G. S. Crown on Nov. 19, 1935; U.S. Pat. No. 2,959,826, issued to F. Larsen et al. on Nov. 15, 1960; U.S. Pat. No. 3,395,723, issued to Hiyoshi Tatsuno on Aug. 6, 1968; U.S. Pat. No. 3,774,723, issued to Johnston on Nov. 27, 1973; U.S. Pat. No. 4,901,748, issued to Shotmeyer on Feb. 20, 1990; U.S. Pat. No. 4,986,446, issued to Montgomery, et al. on Jan. 22, 1991; U.S. Pat. No. 5,114,046, issued to Bryant on May 19, 1992; U.S. Pat. No. 5,299,709, issued to Beerbower et al. on Apr. 5, 1994; U.S. Pat. No. 5,400,924, issued to Brodie on Mar. 28, 1995; U.S. Pat. No. 5,413,135, issued to Poole on May 9, 1995; U.S. Pat. No. 5,526,964, issued to Moore et al. on Jun. 18, 1996; U.S. Pat. No. 5,634,503, issued to Musil et al. on Jun. 3, 1997; U.S. Pat. No. 5,711,456, issued to Bryant on Jan. 27, 1998; U.S. Pat. No. 5,954,085, issued to Moore, et al. on Sep. 21, 1999; U.S. Pat. No. 5,975,371, issued to Webb on Nov. 2, 1999; U.S. Pat. No. 6,105,602, issued to Sistonen on Aug. 22, 2000; U.S. Pat. No. 6,109,290, issued to Sabatinelli on Aug. 29, 2000; U.S. Pat. No. 6,435,204, issued to White et al. on Aug. 20, 2002; U.S. Pat. No. 6,820,378, issued to Lehto on Nov. 23, 2004. Each of these patents are hereby expressly incorporated by reference in their entirety.

U.S. Pat. No. 3,774,723, issued to Johnston on Nov. 27, 1973 entitled Food and Fuel Dispensing Processes and Structures Therefor. The abstract provides the following information. A cooperating set of systems and structures, i.e., a fuel supplying and dispensing system and structure, a food preparation and dispensing system and structure, and an air and gas removal system and structure combined with an air and aroma dispensing system, are arranged so that time required to add gasoline to each of several automobiles and perform related sales and service is used, in combination with positive olfactory and positive visual stimuli and blocking of negative olfactory stimuli, to increase the appetite of the passengers of such automobile for the food products sold at the same installation.

U.S. Pat. No. 4,901,748, issued to Shotmeyer on Feb. 20, 1990 entitled Filling station structure. The abstract provides the following information. A filling station structure includes a canopy for covering a vehicle refueling area. A pair of fuel storage vessels are elevated above the ground and contain separate tanks for holding fuel to be dispensed to the vehicles. The fuel storage vessels are contiguous with the canopy to form an integrated, covered filling station with above-ground, elevated tanks.

U.S. Pat. No. 4,986,446, issued to Montgomery, et al on Jan. 22, 1991, entitled Service Station Improvements. The abstract provides the following information. Service station for dispensing fuel to vehicles from fuel dispensers connected by fluid conduits to one or more fuel storage tanks characterized in that the fuel storage tanks are self-contained, flexible and collapsible bladder type tanks supported in an elevated position above the fuel dispensers and the vehicles to which fuel is to be dispensed. An open top containment vessel may also be supported at an elevated position and into which the bladder type tanks may be preferably lowered for non-attached disposition therein.

U.S. Pat. No. 5,114,046, issued to Bryant on May 19, 1992, entitled Above ground fuel storage and dispensing apparatus. The abstract provides the following information. An above ground fuel storage and dispensing apparatus that is self contained and includes a support frame on which a fuel storage tank is mounted and surrounded by a fuel containment vessel formed by side walls and a bottom of the support frame for containing any fuel that may leak from the tank or fittings and pipe extending from the tank. One corner of the support frame has the vertical side walls recessed to form a recessed compartment for the fuel dispensing pump and electrical equipment which are thereby protected by the frame and side walls from being damaged by vehicles or the like operated in the vicinity.

U.S. Pat. No. 5,299,709, issued to Beerbower et al. on Apr. 5, 1994 entitled Above ground fuel storage tank. The abstract provides the following information. An above ground storage tank is provided having an inner tank for primary storage, and an outer casing surrounding the inner tank. The outer casing includes both a casing body defining an opening, and a removable lid positioned over the opening. A fire-resistant seal is provided between the lid and casing body to inhibit transmission of fire and explosion hazards to stored materials, as well as preventing leaks and spills from escaping containment. It is preferred to further add a weather-resistant sealant around the periphery of the fire-resistant seal to inhibit weathering thereof.

U.S. Pat. No. 5,400,924, issued to Brodie on Mar. 28, 1995, entitled Above-ground fuel tank system. The abstract provides the following information. In an above ground fuel storage system, a containment vessel is selected to resist impact shock, as well as deformation from fire's heat and internal hydraulic pressures in the presence of such heat. The fuel delivery input port, the fuel tank, all fuel lines and dispensing equipment are mounted fully enclosed within the confines of the containment vessel. The containment vessel may be transportable or be permanently emplaced on use site. Solar energy is utilized to allow operation in undeveloped areas. A remote control device permits system shut down to be initiated from a distance.

U.S. Pat. No. 5,413,135, issued to Poole on May 9, 1995, entitled Apparatus for serving comestibles and method of erecting same. The abstract provides the following information. A food and beverage serving apparatus that comprises multiple separate serving stations and a connecting superstructure all prefabricated to facilitate installation in an existing building's food service area with the serving stations spaced apart in a predetermined arrangement forming separate serving locations and the superstructure providing a means of unobtrusively routing utility connections, e.g., electricity, natural gas, water, etc., from remote utility sources to the serving stations, thereby enabling demolition or structural modification of the building area to be minimized and installation of the apparatus to be simplified.

U.S. Pat. No. 5,526,964, issued to Moore et al. on Jun. 18, 1996 entitled Fuel dispensing system. The abstract provides the following information. A fuel dispensing system comprising a foundation module including an underground fuel reservoir to store fuel to be dispensed and a conduit containment trough to house a fuel supply conduit and fuel dispensing conduit therein, a fuel dispensing module including a pump island to support a fuel dispensing device thereon and a canopy module held in fixed spaced relationship above the fuel dispensing module.

U.S. Pat. No. 5,634,503, issued to Musil et al. on Jun. 3, 1997, entitled Automated refuelling system. The abstract provides the following information. A refuelling system is provided, the system comprising: a plurality of vertically telescoping elements, the telescoping elements containing a constant length of flexible conduit for transfer of fuel; at least one vertically movable pulley to maintain a constant length of flexible hose within the telescoping elements; an overhead gantry capable of moving the vertically telescoping elements in two horizontal essentially perpendicular axes; and a rotating lower portion of the telescoping elements capable of rotating about an essentially vertical axis and supporting a fuel nozzle. The refuelling system of the present invention does not result in significant segments of unsupported lengths of conduits for fuel, compressed air, vapor recovery, electrical power or control or sensor signals. It is relatively simple and utilizes readily available components and parts, and does not required significant machining of components. This results in an installation that is economical to install and operate.

U.S. Pat. No. 5,711,456, issued to Bryant on Jan. 27, 1998, entitled Above ground fuel transfer module. The abstract provides the following information. An above ground fuel transfer module includes a bottom surrounded by vertical side walls forming a fuel containment vessel. One corner of the support frame has the vertical side walls recessed to form a recessed compartment for a fuel dispensing pump and electrical equipment which are thereby protected by the frame and side walls from being damaged by vehicles or the like operated in the vicinity. An electronic circuit card connected to a control panel controls the transfer of fuel and monitors safety conditions.

U.S. Pat. No. 5,954,085, issued to Moore, et al. on Sep. 21, 1999, entitled Prefabricated modular fuel dispensing system. The abstract provides the following information. A fuel dispensing system comprising a foundation module including an underground fuel reservoir to store fuel to be dispensed and a conduit containment trough to house a fuel supply conduit and fuel dispensing conduit therein, a fuel dispensing module including a pump island to support a fuel dispensing device thereon and a canopy module held in fixed spaced relationship above the fuel dispensing module.

U.S. Pat. No. 5,975,371, issued to Webb on Nov. 2, 1999 entitled Modular aboveground service station and method of assembly. The abstract provides the following information. A modular, portable, environmentally friendly aboveground fueling assembly includes at least one pad member that is supported on the ground, and that is fabricated from a material that is heat resistant and that is resistant to exposure to petroleum products. A portable aboveground fuel tank is supported on the pad member, and at least one pumping station is included for dispensing fuel from the tank to a customer. A freestanding structure is secured to the fuel tank and the pad, and the structure is designed to give an aesthetic effect of a more substantial, permanent facility than would be given by the aboveground fuel tank standing alone. The components of the assembly are generally designed so as to be conveniently portable and so as to be simple to assemble and disassemble in the field. The assembly serves a need for inexpensive and environmentally friendly service stations, particularly in rural areas and underdeveloped countries.

U.S. Pat. No. 6,105,602, issued to Sistonen on Aug. 22, 2000, entitled Fuel station and method for assembling of the same. The abstract provides the following information. A fuel dispensing station having at least one underground tank, a pump island including at least one fuel pump for dispensing the fuel contained in the tank, and a pump roofing. The fuel dispensing station is provided with a common foundation wherein, directly or indirectly, the fuel tank or tanks, and other necessary tanks, the pump island, and pump roofing are all connected to each other as an integral unit. The dispensing station is adapted to be transported to an installation site as readily erectable blocks.

U.S. Pat. No. 6,109,290, issued to Sabatinelli on Aug. 29, 2000, entitled Fuel dispensing system. The abstract provides the following information. A prefabricated modular fuel dispensing system comprising a foundation, including a longitudinally extending tubular underground fuel tank, having a fuel storage compartment and a conduit containment trough along its upper surface, and a canopy supported above said tank when it is in place, the support being characterized by two sections, one connected to the tank side, and an upper section being attached to the canopy. The two sections are interconnected with horizontal impact relief structure arranged to fail when subjected to lateral impact of sufficient magnitude to otherwise bend the lower column portion or damage the tank.

U.S. Pat. No. 6,435,204, issued to White et al. on Aug. 20, 2002 entitled Fuel dispensing system. The abstract provides the following information. Dispensing system for automotive fuel including a casing mounted within the ground and containing a fuel flow meter and an associated valve. The meter is linked by a fuel line to a fuel tank. An above-ground structure is provided for supporting a dispensing hose to which the meter and associated valve within the casing are linked by a delivery line passing externally of the casing. The casing is adjacent to but separate from the above-ground structure whereby the aboveground structure is mounted independently of the casing.

U.S. Pat. No. 6,820,378, issued to Lehto on Nov. 23, 2004, entitled System and method specifically intended for the construction of fuel distribution forecourts. The abstract provides the following information. A system and method specifically intended for the construction of fuel distribution forecourts, in which the forecourt contains at least one distribution pump (17), possibly an attached automatic dispenser (9), a pillar (4), which is specifically installed onto a concrete footing, to support the roof and necessary electrical and pipework systems for the drawing of fuel from the fuel storage tank and dispensing to motor vehicles and equivalents. The pumps (17), automatic dispenser (9) and other necessary ground-based equipment are installed on the island (6, 7), which is in turn supported (11, 12) on the roofs concrete footing.

Previous inventions towards fueling stations have provided underground tanks, underground piping, or both to provide fuel to dispenser stations. These stations require substantial preparation of the location site as the ground must be cleared and excavated prior to installation of the tanks and the piping. Additionally, the underground piping and tanks provide a possibility for leaks of fuel into the ground, forcing station owners to periodically test the site for leaks. As can be appreciated, testing underground is difficult, and therefore, a need exists to eliminate or reduce the cost of testing underground for leaks.

Thus, it may be seen that these prior art patents are very limited in their teaching and utilization, and an improved fuel station with above-ground tank storage and above-ground piping is needed to overcome these limitations.

SUMMARY OF THE INVENTION

The present invention is directed to an improved fueling station structure without subterraneous tanks or piping and an improved fuel station island configuration.

In one embodiment, the invention includes a fuel tank area having above-ground fuel tanks and fuel piping and a canopy area having a kiosk and above-ground piping extending along the roof of the canopy under the decking and descending within columns to fuel station islands having above-ground piping and containment.

It is an object of the present invention to provide a fueling station structure which eliminates the need for underground fuel pipes and fuel tanks.

It is an object of the present invention to provide a fueling station structure which can be easily monitored for fuel leaks.

It is a further object to provide a fuel station structure which allows for easy installation of fuel tanks.

It is a further object to provide a fuel station structure which is easily constructed on-site.

It is a further object to provide a fuel station island structure which is constructed off-site and easily installed on-site.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

The present invention is directed to a fuel station. Specifically, the present invention provides a fuel station with multiple above-ground storage tanks 510, 511, 512 having submerged pumps 2000 to deliver fuel under pressure to fuel dispensing islands by way of above-ground piping 1501 hung under a canopy 1500 covering the fuel dispensing islands.

Figure 1:
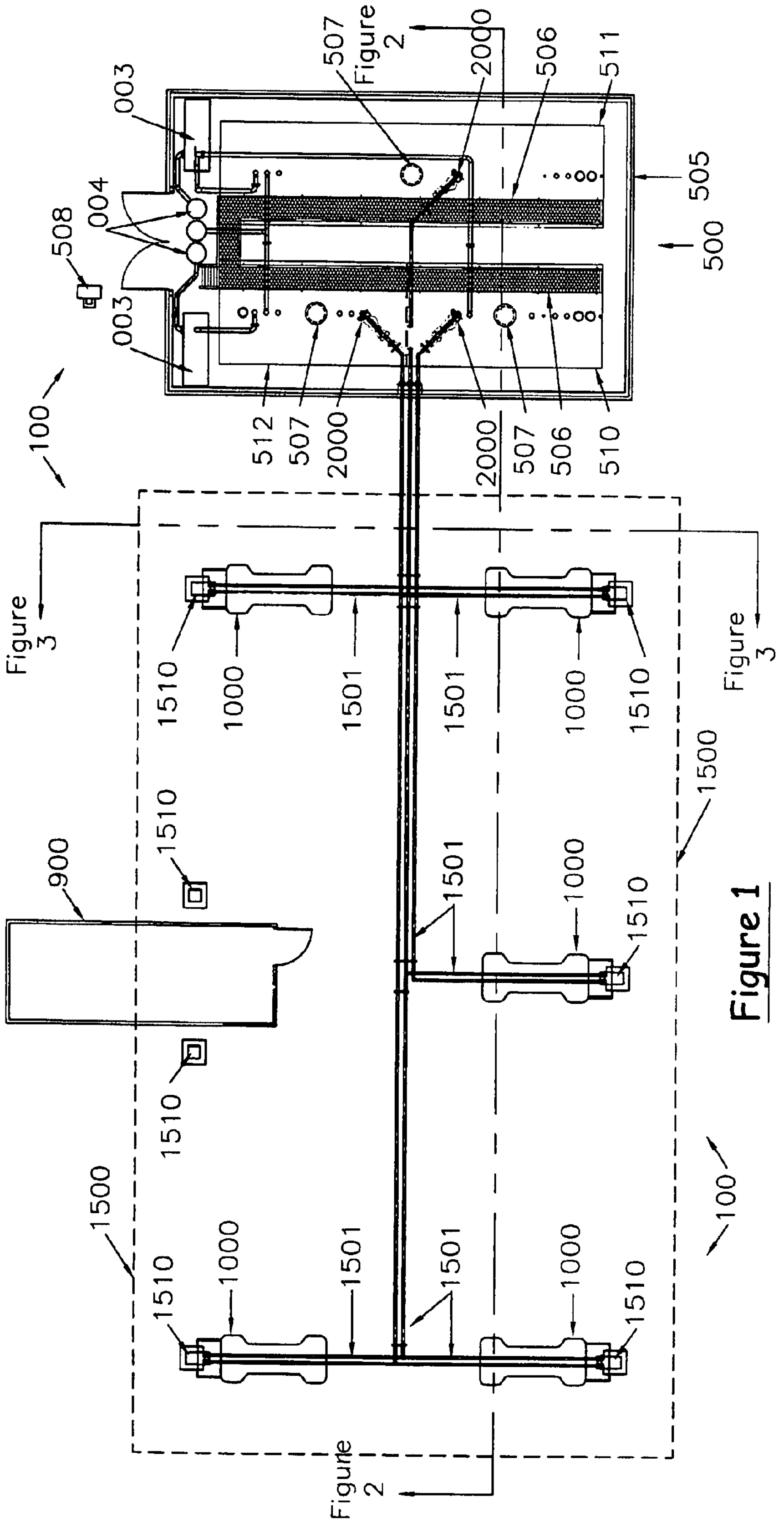
FIG. 1 is a top cutaway view of my new improved fueling station and showing line 2-2 and line 3-3.
Figure 3:
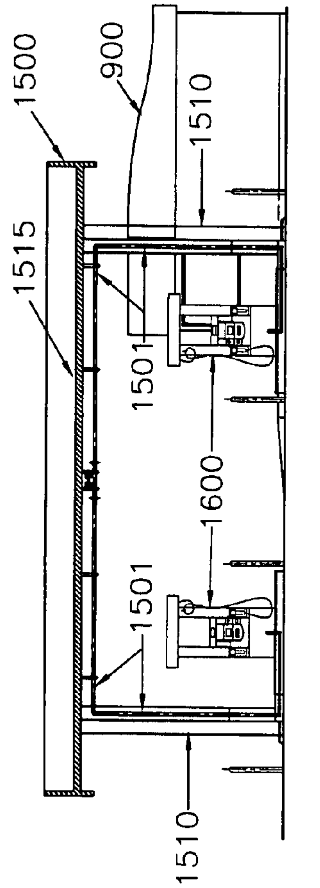
FIG. 3 is a front side view of the nozzle dispenser stations of the fueling station along line 3-3.

As shown in FIG. 1 of the drawings, one exemplary embodiment of the present invention is generally shown as fuel station structure 100 for fueling vehicles. As contemplated by the present invention, the fuel station 100 utilizes above-ground storage tanks 510, 511, 512 for fuel storage and above-ground fuel pipes 1501 to transport fuel from the tank storage 500 to fuel dispensing islands 1000.

Figure 2:
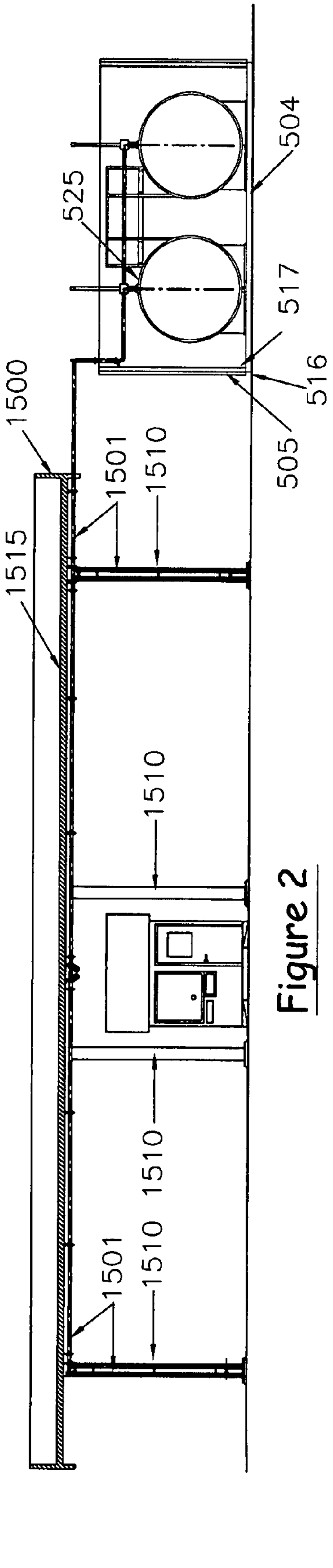
FIG. 2 is a front side cutaway view of the fueling station along line 2-2.
Figure 4:
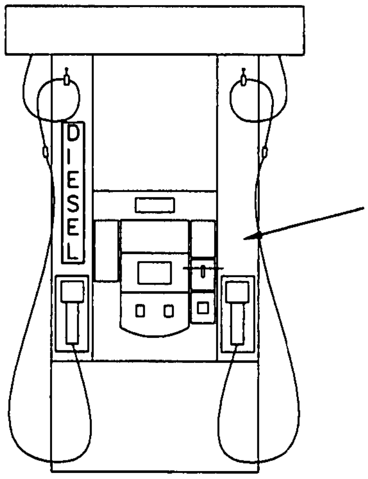
FIG. 4 is a front side view of a two-nozzle dispenser station.
Figure 5:
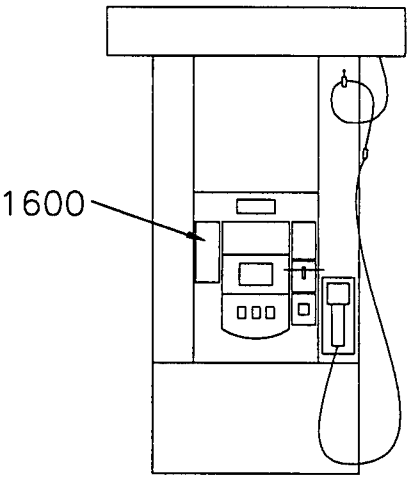
FIG. 5 is a front side view of a one-nozzle dispenser station.

As shown in FIG. 1 and FIG. 2, the fuel station 100 generally includes a fuel tank storage area 500 and a canopy area 1500 supporting and housing the fuel pipes 1501, fuel dispensing islands 1000, and kiosk 900 for service station control equipment and/or attendant. Fuel pipes 1501 are hung under the canopy decking 1515 down the center of the canopy.

The tank storage 500 generally includes multiple fuel tanks 510, 511, 512, a reinforced wall structure 505 and foundation 504, a catwalk 506, bolted manways 507, and tank gauges 508. Other fuel tank equipment known in the art may also be included within the tank storage area 500. Multiple tanks 510, 511, 512 are utilized to allow for the storage of multiple fuel types, such as regular unleaded, premium unleaded, and diesel.

Fuel may be delivered to the fuel station structure 100 by a tanker truck. The tanker truck connects to an off-loading piping system 3 via a spill containment device 4. The driver of the tanker truck manually checks the current product levels in the fuel tanks. The driver determines the type of fuels which need to be replenished and then opens the desired valves 9 leading to the correct tanks. The fixed off-loading pump 3 is turned on allowing the fuel from the tanker to be transferred to the tanks. An electronic site monitoring system 508 is used to monitor the rising fuel level. Should the tank reach an "overfill" level, the monitoring system signals an alarm, typically an audio-visual alarm, and the monitoring system removes power to the off-loading pump. The "overfill" level can be set at any height required. The monitoring system may be manually reset to continue adding fuel beyond the set capacity. The monitoring system may be altered or programmed to allow for federal, state or local requirements for capacity of tanks and storage of flammable liquids.

Figure 6:
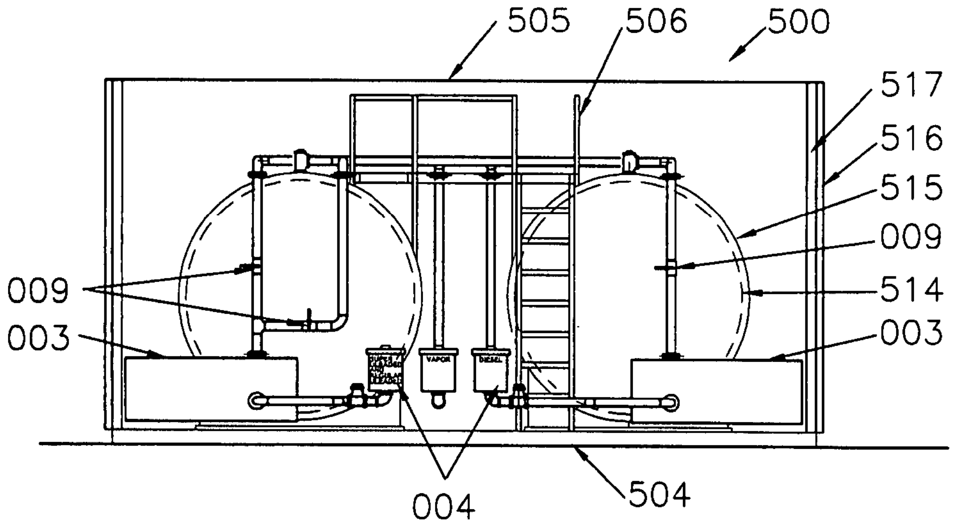
FIG. 6 is a front side cutaway view of the fuel tank area along line 2-2.

The fuel tanks 510, 511, 512, as shown in FIG. 6, are generally of steel construction with an annular space between the tank exterior 515 and the tank interior wall 514. Those skilled in the art will recognize that fiberglass tanks commonly used in the industry can be frequently damaged during subterranean installation for fuel stations. The present fuel station 100 removes this possibility by installing its steel tanks 510, 511, 512 above-ground within its wall structure 505. The annular space of the fuel tanks 510, 511, 512 is monitored by the electronic site monitoring system. Each tank contains pressure and vacuum vents.

The wall structure 505 and foundation 504 of the tank storage area 500 are generally used for aesthetics, support and protection of the tanks 510, 511, 512. The wall structure 505 is composed an exterior wall 516 and an interior structure 517 to provide additional protection around the tanks 510, 511, 512. The wall structure 505 and foundation 504 are generally composed of concrete or other similar sturdy materials, such as sheet metal, steel, stone or brick.

The fuel tank storage area 500 is generally set apart from the canopy area 1500 to distance the fuel tanks 510, 511, 512 away from the traffic of the canopy area 1500. In this manner, customers for the fuel station 100 are not impeded by the fuel tanks 510, 511, 512 while using the fuel station 100. Fuel pipes 1501, 1502, 1503 running along the canopy 1500 transport the different fuels from the fuel tanks 510, 511, 512 to the fuel dispensing islands 1000.

The canopy area 1500 generally includes a multitude of columns 1510, flat canopy decking 1515, the fuel pipes 1501, 1502, 1503, and a multitude of fixtures 1516 to attach the pipes 1501, 1502, 1503 to the canopy 1515. The canopy decking 1515, the fuel pipes 1501, 1502, 1503 and the fixtures 1516 are typically composed of a metal, a metal alloy, or a composite material. The columns 1510 additionally have metal or metal alloy parts, but may also be composed of alternative materials such as concrete, stone, or brick.

The pipes 1501, 1502, 1503 are welded together to form a substantial barrier against leaks. The pipes 1501, 1502, 1503 run from a submerged electric pump 2000 in the tanks 510, 511, 512 parallel with the ground or substantially parallel to the ground until the pipes 1501, 1502, 1503 reach the wall structure 505 of the storage area 500. The pipes 1501, 1502, 1503 connected to the submerged pump 2000 may be rigid metal piping or semi-rigid fire-resistant piping. The pipes 1501, 1502, 1503 then turn ninety degrees and run ascend upwards, parallel to the wall structure 505, until the pipes 1501, 1502, 1503 are raised approximately fifteen feet in the air, below the height of the canopy decking 1515. The ascending pipes form the ascending portion of the piping system. The pipes 1501, 1502, 1503 then turn ninety degrees and run parallel to the ground across to the canopy decking 1515.

Figure 7:
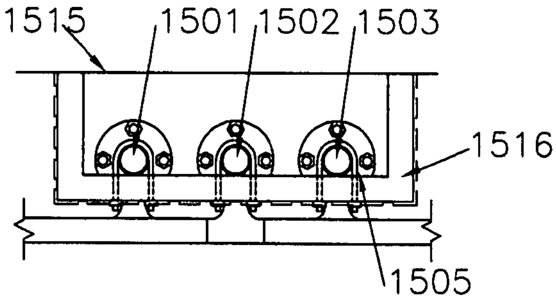
FIG. 7 is a front side cutaway view of the fuel piping rack.
Figure 9:
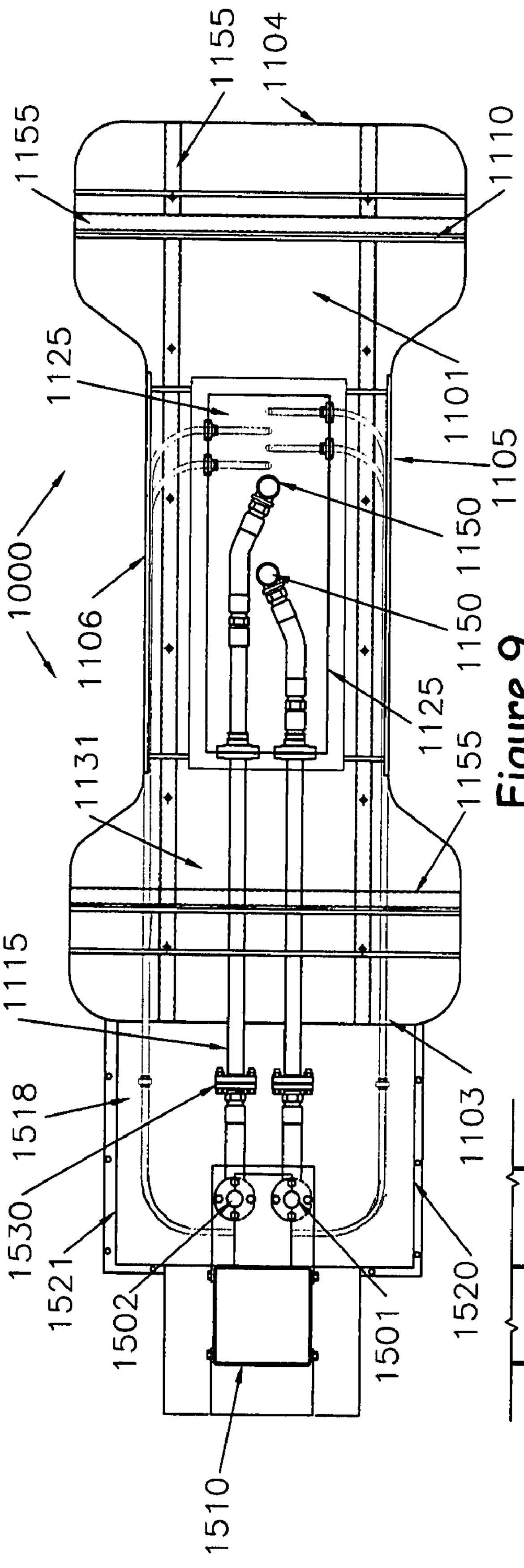
FIG. 9 is a top cutaway view of a fuel station island.
Figure 8:
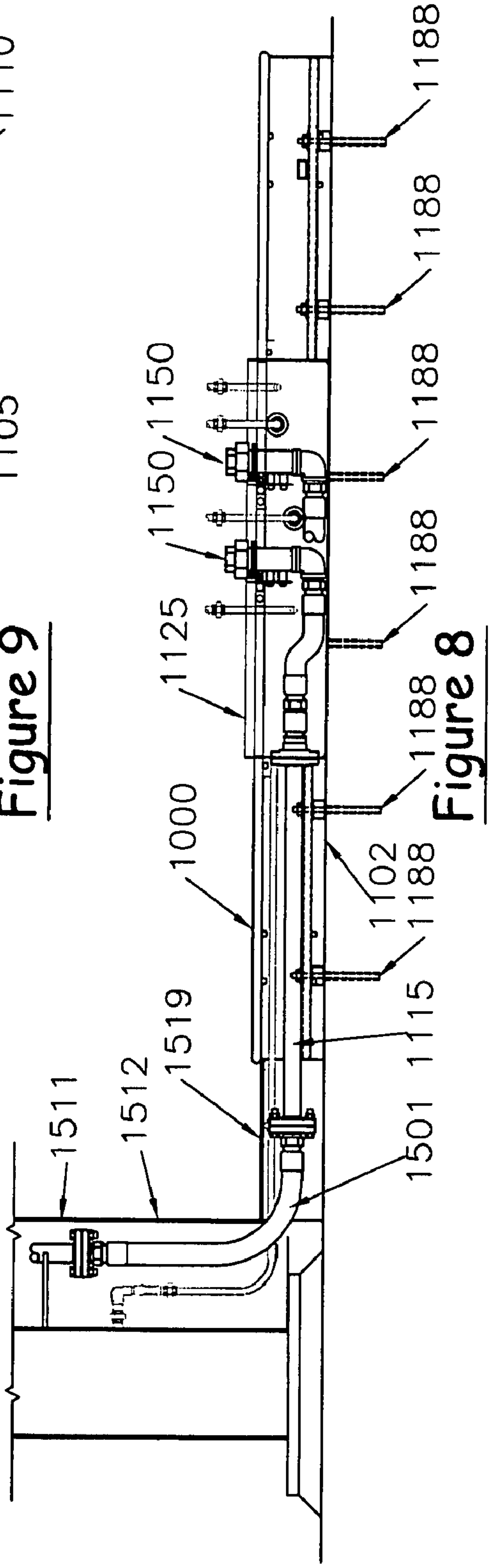
FIG. 8 is a front side cutaway view the fuel station island.

The canopy decking 1515 runs parallel to the ground or substantially parallel to the ground over the pipes 1501, 1502, 1503. As shown in FIG. 7, the canopy decking 1515 covers the top 1505 of the pipes 1501, 1502, 1503. Fixtures 1516, such as u-bolts, are used to affix the pipes 1501, 1502, 1503 below the canopy decking 1515. In this manner, the pipes 1501, 1502, 1503 are sheltered from the elements. Additionally, the pipes 1501, 1502, 1503 are easily visible to the fuel station attendant to monitor the fuel pipes 1501, 1502, 1503 for leaks. As will be appreciated by those skilled in the art, fuel station with subterraneous fuel pipes must be monitored at least once a year to determine if any fuel has leaked into the ground. Typically, this monitoring requires substantial time and funding for a fuel station as the station must be closed and an independent monitoring group must be paid to observe the fuel tanks and pipes. The present invention eliminates these costs by providing fuel pipes 1501, 1502, 1503 which may be monitored by the owner of a regularly paid employee. The exposed pipes 1501, 1502, 1503 below the canopy decking 1515 will allow leaks to be readily apparent to an attendant or an owner. All electrical conduits are routed above the canopy decking 1515.

As shown in FIG. 1, the fuel pipes 1501, 1502, 1503 run along the canopy decking 1515 until turning at ninety degree angles to travel towards a fuel station island 1000. The fuel station 100 may feature one or more fuel dispensing islands 1000. The embodiment shown in FIG. 1 utilizes five islands 1000. The two of the fuel pipes 1501, 1502, 1503 connect to the each of the islands 1000 by traveling across the canopy decking 1515, forming an elevated piping system, and then descend downwards, perpendicular to the ground, along, or within, columns 1510 placed by each island 1000, forming a descending portion of the piping system. In another embodiment, three fuel pipes 1501, 1502, 1503 carrying fuel connect to an island 1000 located under the center of the canopy 1515. The columns 1510 may provide protection around the fuel pipes 1501, 1502, 1503 until the pipes connect with the fuel dispenser 1600 located on the island structure 1000. In a preferred embodiment, the columns 1510 may feature a metal panel 1511 around the base 1512 of the column 1510 to provide additional protection to the pipes 1501, 1502, 1503. The panel 1511 may additionally allow access to the pipes 1501, 1502, 1503 through the column base 1512.

The pipes 1501, 1502, 1503, after reaching the base 1512 of the column, again turn ninety degrees to run parallel to the ground. The island 1000 may abut the column 1510 to allow access for the pipes 1501, 1502, 1503 to the island 1000 or the island 1000 may be distanced from the column 1510 with the pipes 1501, 1502, 1503 running under a protective cover 1518 to access the island 1000. The protective cover 1518 generally includes a top 1519, a front side 1520, and a back side 1521 composed of metal panels running from the base 1512 of the column 1510 to the left side 1103 of the island 1000 to provide additional protection to the pipes 1501, 1502, 1503. The protective cover 1518 may additionally allow access to the pipes 1501, 1502, 1503 by way of a door cut into the top 1519 of the cover.

The terminus for the fuel pipes 1501, 1502, 1503 is the fuel station island 1000. The island 1000 generally features the island base 1100 and fuel dispenser 1600. The present invention provides a fuel island base 1100 which may be constructed off-site for easy installation at the fuel station 100.

As will be appreciated by those skilled in the art, island bases are typically formed on-site at the fuel station 100 by pouring concrete in the island formation around exposed under-ground fuel piping. The island base 1100 of the present invention differs from the previous island bases by using above-ground piping as well as an easily installed island form. The island base 1100 may be generally formed in the bone shape of traditional island bases. The base 1100 generally has a fuel piping 1115 which connects to the fuel pipe 1501, 1502, 1503 of the canopy 1500, a dispenser sump 1125 which contains any leaks which may develop inside the dispenser 1600 or fuel lost during filter changes, and a frame structure 1110 having an exterior shape and formed of a metal or a metal alloy with a top 1101, a bottom 1102, a left side 1103, a right side 1104, a front 1105, and a back 1106. The frame structure 1110 further includes reinforcing bars 1155 within the center 1131 of the frame 1110.

The fuel system exterior to the fuel station island, namely the fuel pipes 1501, 1502, 1503 of the canopy area 1500, connect to the fuel station island at junction 1530. In the preferred embodiment, junction 1530 is formed under the protective cover 1518 on the left side 1103 of the island base 1100. Junction 1530 is formed by a welded flange-fitting joint of the fuel pipes 1501, 1502, 1503 and the fuel piping 1115 of the island 1100. The fuel piping 1115 runs from the exterior left side 1103 of the island 1100, through the central region 1131 of the island base 1100, to the dispenser sump 1125. At the dispenser sump 1125, the piping 1115 turns ninety degrees, running perpendicular to the ground, and travels up to a shear valve 1150 for connection to the fuel dispenser 1600.

The base frame 1110 is generally constructed prior to installation of the island base 1100, preferably off-site. The island form is then constructed with the base frame 1110, the piping, shear valves 1150, dispenser sump 1125, and anchors 1188. The island form is then positioned at a cleared place at the fuel station 100 site, bolted to the ground using expansion anchors and then filled with concrete to the top of the island form. The island base 1100 then may be used to mount the fuel dispenser 1600 atop the island base 1100 above the dispenser sump 1125. The dispenser sump 1125 have bolting flanges for the base of the dispenser 1600. The product piping is then connected to the dispenser.

From the foregoing, it will be seen that this invention is well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. A filling station structure located on a foundation and providing fuel for refueling vehicles, said filling station structure comprising:

at least one fuel storage tank holding fuel to be dispensed to vehicles, said fuel storage tank located above the foundation and having at least one submerged pump adapted to deliver fuel under pressure;

a canopy covering an area for refueling vehicles, said canopy being elevated above the level of the vehicles to be refueled and having a decking for mounting lights above said area for refueling vehicles; and a piping system for transmitting fuel from said at least one fuel storage tank and fluidly connected to said submerged pump, said piping system comprising:

an elevated piping system located above the foundation and being mounted to said canopy within said area for refueling vehicles;

a descending piping system located above the foundation and being perpendicular to said canopy; and at least one fuel dispenser island fluidly connected to said piping system.

2. The filling station structure of claim 1, said elevated piping system mounted to said canopy decking.

3. The filling station structure of claim 1, further comprising multiple columns supporting said canopy.

4. The filling station structure of claim 3, said descending piping system mounted to said multiple columns.

5. The filling station structure of claim 1, further comprising an attendant's booth.

6. The filling station structure of claim 1, said piping system further comprising an ascending piping system.

7. A filling station structure located on a foundation and providing fuel for refueling vehicles, said filling station structure comprising:

at least one fuel storage tank holding fuel to be dispensed to vehicles, said fuel storage tank having at least one submerged pump adapted to deliver fuel under pressure;

a canopy covering an area for refueling vehicles, said canopy being elevated above the level of refueled and having a decking for mounting lights above said area for refueling vehicles; and a piping system for transmitting fuel from said at least one fuel storage tank and fluidly connected to said submerged pump, said piping system comprising:

an elevated piping system located above the foundation and being mounted to said canopy within said area for refueling vehicles;

a descending piping system located above the foundation and being perpendicular to said canopy; and at least one fuel dispenser structure for securing to the foundation and fluidly connected to said filling station piping system, said fuel dispenser comprising an island base form composed of a frame structure having an outer wall and reinforcing members;

a dispenser sump contained within and secured to said frame structure;

a piping system for providing at least one fuel from the exterior fuel system to within said fuel dispensing structure, said piping system comprising a junction for connection to the exterior fuel system, said junction being above the foundation and located exterior to said outer wall of said island base form;

at least one pipe fluidly connected to said junction and passing through said outer wall to said dispenser sump, said at least one pipe being above the foundation;

a shear valve fluidly connected to said at least one pipe and being above-ground; and a dispenser for dispensing fuel, said dispenser secured above said dispenser sump and fluidly connected to said shear valve.

8. The fuel dispenser structure of claim 7 further comprising a plurality of anchors affixed to said frame structure, said anchors adapted to secure to the foundation.

9. The filling station structure of claim 7, said elevated piping system mounted to said canopy decking.

10. The filling station structure of claim 7, further comprising multiple columns supporting said canopy.

11. The filling station structure of claim 10, said descending piping system mounted to said multiple columns.

12. The fuel dispenser structure of claim 7, said outer wall having the shape of a dog bone.

13. The filling station structure of claim 7, further comprising an attendant's booth.

14. The fuel dispenser structure of claim 7, said island base form further comprising a concrete interior fill within said outer wall.

15. The filling station structure of claim 7, said fuel storage tank located above the foundation.

16. The filling station structure of claim 7, said piping system further comprising an ascending piping system.

17. A fuel dispensing structure for securing to a foundation and connected to an exterior fuel system, the fuel dispensing structure comprising:

an island base form comprising a frame structure having an outer wall and reinforcing members;

a dispenser sump contained within and secured to said frame structure;

a piping system for providing at least one fuel from the exterior fuel system to within said fuel dispensing structure, said piping system comprising a junction for connection to the exterior fuel system, said junction being above the foundation and located exterior to said outer wall of said island base form;

at least one pipe fluidly connected to said junction and passing through said outer wall to said dispenser sump, said at least one pipe being above the foundation;

a shear valve fluidly connected to said at least one pipe and being above-ground; and a dispenser for dispensing fuel, said dispenser secured above said dispenser sump and fluidly connected to said shear valve.

18. The fuel dispensing structure of claim 17, said outer wall having the shape of a dog bone.

19. The fuel dispensing structure of claim 17, said island base form further comprising a concrete interior fill within said outer wall.

20. The fuel dispenser structure of claim 17 further comprising a plurality of anchors affixed to said frame structure, said anchors adapted to secure to the foundation.

* * * * *